(12) United States Patent
Meckler

(10) Patent No.: US 7,098,425 B2
(45) Date of Patent: Aug. 29, 2006

(54) UNIVERSAL WIRE FEEDER

(75) Inventor: Andreu P. Meckler, Euclid, OH (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 206 days.

(21) Appl. No.: 10/805,944

(22) Filed: Mar. 22, 2004

(65) Prior Publication Data

US 2005/0205543 A1    Sep. 22, 2005

(51) Int. Cl.
*B23K 9/10*    (2006.01)

(52) U.S. Cl. ............................................... 219/137.71

(58) Field of Classification Search ............ 219/137.2, 219/137.7, 137.71, 137.9, 136
See application file for complete search history.

(56) References Cited

U.S. PATENT DOCUMENTS

| | | | |
|---|---|---|---|
| 4,584,458 A * | 4/1986 | Tremblay et al. | 219/137.71 |
| 4,973,821 A * | 11/1990 | Martin | 219/137.71 |
| 2004/0245232 A1* | 12/2004 | Ihde et al. | 219/137.71 |

* cited by examiner

*Primary Examiner*—Clifford C. Shaw
(74) *Attorney, Agent, or Firm*—Fay Sharpe Fagan Minnich & McKee; Brian E. Turung

(57) ABSTRACT

A wire feeder that can be connected to a variety of power supplies which includes a power conditioner that can detect a current and/or voltage level from a particular power supply and modify the current and/or voltage level when required so as to enable the wire feeder to operate in conjunction with the arc welder when connected thereto.

34 Claims, 2 Drawing Sheets

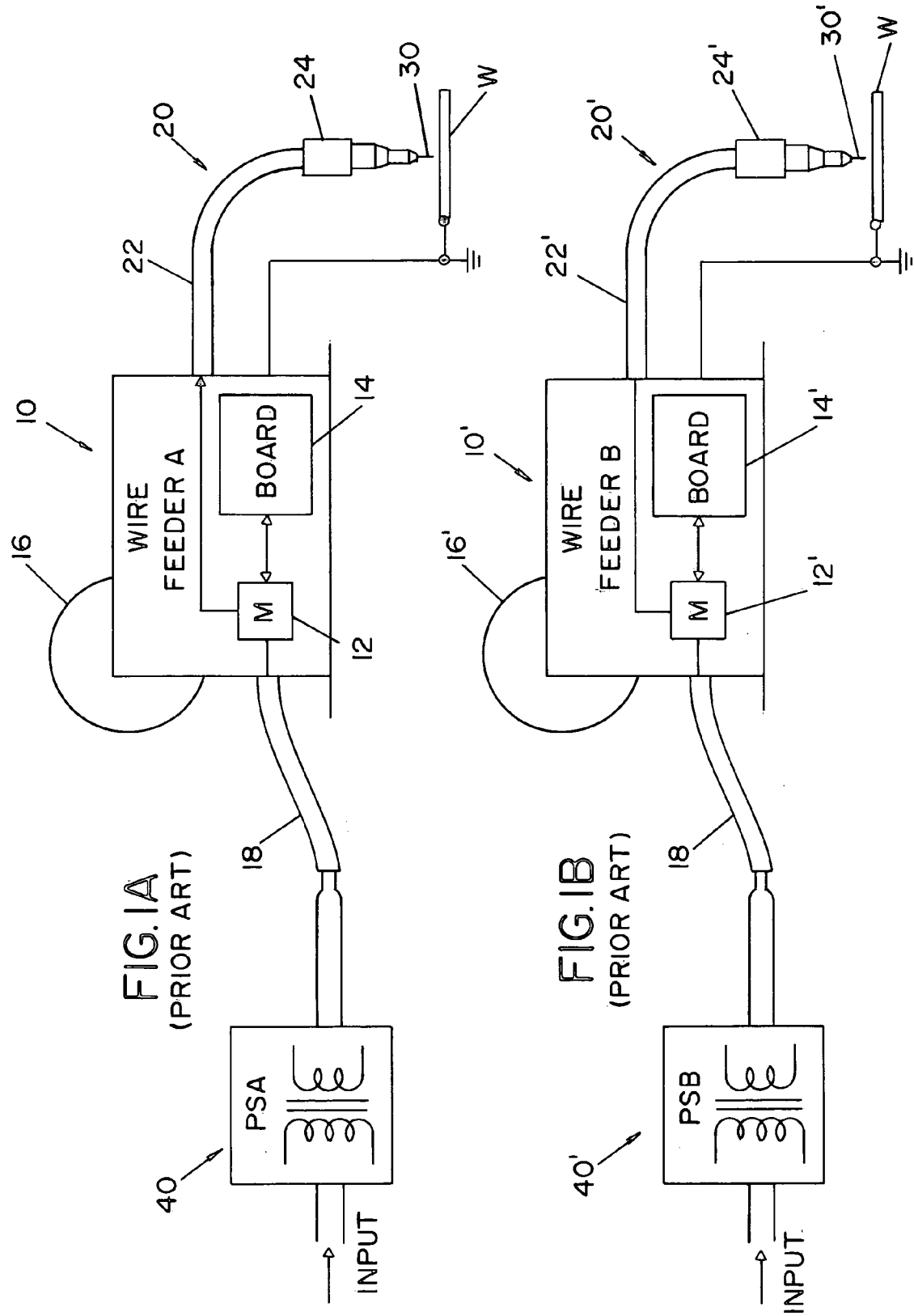

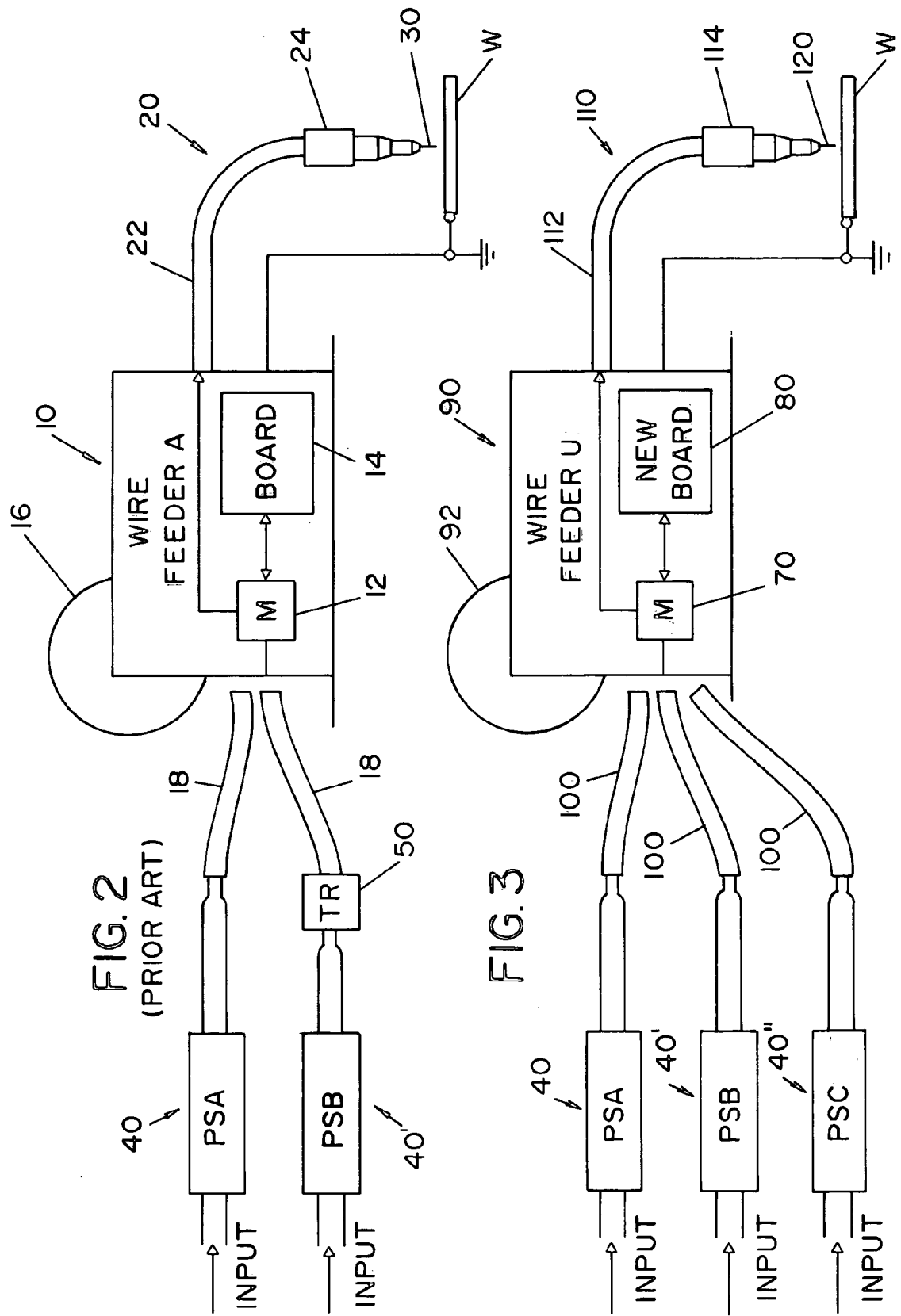

UNIVERSAL WIRE FEEDER

The present invention relates generally to the art of welding, and more particularly to a wire feeder that can be used with different types of welding machines.

BACKGROUND OF THE INVENTION

Welding wire feeder systems are commonly integrated with or used in conjunction with an arc welder to feed a wire electrode to a workpiece. The electrode may be a solid wire electrode, a coated electrode, or a cored electrode. Typically, the wire feeder is used in conjunction with a MIG or TIG arc welding process. Presently, there are just a few principal manufacturers of welding equipment. These manufacturers include The Lincoln Electric Company, Miller Electric, and ESAB. Each of these manufacturers construct welding accessories such as wire feeders, welding guns, etc. that are designed to be used with a specific brand of welding machine. With respect to wire feeders, it is common for one manufacturer to design and build a wire feeder which operates on a different voltage than another manufacturer. As a result, welding accessories from various manufacturers are typically not intermixed with different brands of welders.

Due to the incompatibility of a wire feeder for an arc welder from one manufacturer on an arc welder from another manufacturer, it becomes difficult or impossible for an operator to switch the wire feeder of one manufacturer to another arc welder by a different manufacturer when a particular arc welder malfunctions or requires service. It is common at a particular welding site to have several different brands of arc welders. In a situation where one brand of arc welder is out of service, an operator typically cannot use another type of arc welder to continue the welding operation unless the arc welder is of the same brand as the one that was removed from service. As a result, costly downtime occurs when an arc welder is suddenly taken out of service during a welding operation. One way to address this problem is to have backup welders and wire feeders on hand to minimize downtime. However, welding units and wire feeders are costly and a burden to store and transport. As a result, spare welding units and wire feeders are typically not taken to a welding site. Some users have, in the past, used a transformer to connect one brand of wire feeder to another brand of welder. The transformer is used to ramp up or ramp down the voltage and/or current from a particular brand of arc welder so that a different brand of wire feeder can be used with the arc welder. The transformer is typically connected to the power cable that connects the wire feeder to the arc welder. The transformer is commonly connected to the power cable by cutting the power cable and then electrically connecting the transformer in series with the power cable. The connecting of the transformer to the power cable has caused problems such as when the transformer is not properly connected to the power cable thereby causing damage to the wire feeder and/or arc welder, and/or an improper transformer is connected to the power cable thereby making the wire feeder inoperative and/or damaging the wire feeder and/or welder. Furthermore, the use of a particular transformer only enables a user to connect one brand of wire feeder to a specific brand of arc welder of another brand, thus still limiting the compatibility of the wire feeder to be used with a variety of different arc welders.

In view of the present state of the art of wire feeders, there is a need for a wire feeder that can be simply connected to a plurality of different arc welders without having to connect a transformer to the power cable of the wire feeder or significantly modifying the electronics and/or components of the wire feeder.

SUMMARY OF THE INVENTION

The present invention is directed to an apparatus and method of arc welding and more particularly directed to a welding wire feeder that can be easily connected to different brands of arc welders without having to significantly modify the wire feeder. The invention will be described with particular reference to wire feeders in association with MIG or TIG welders; however, it will be appreciated that the invention can be expanded to other types of welders. The wire feeder includes electrical circuits that can enable the wire feeder to be connected to a plurality of brands of welders without having to modify the circuitry and/or without having to install circuitry to the wire feeder.

In accordance with one aspect of the invention, there is provided a wire feeder that includes a welding wire motor used to feed a consumable welding electrode through a welding gun and to a workpiece at a desired speed. A wire reel may be connected to the wire feeder to constantly feed the welding wire to the wire feeder and through the welding gun. Alternatively, the welding wire may be continuously fed from a wire drum or container. The wire feeder may include a wire feed speed selector to adjust the speed of the welding electrode that is fed to the welding gun. The wire feeder typically includes a welding gun connector to connect a welding gun cable to the wire feeder so that welding current is directed to the gun during a welding operation. The welding gun also typically includes an electrode cable which is connected to the wire feeder so that the welding electrode can be directed from the wire feeder through the cable and into the welding gun. The electrode cable and welding gun cable may be a single cable or multiple cables. The wire feeder can include one or more trays or compartments used to store various types of welding accessories. The wire feeder can also include one or more switches to activate or deactivate the wire feeder and/or one or more features of the wire feeder. The wire feeder may also include a shielding gas connector used to connect to a welding shielding gas source and a shielding gas line to direct the shield gas from the wire feeder to the welding gun. The shielding gas is directed through the wire feeder and into the welding gun to enable the shielding gas to be properly directed about a weld puddle during a welding process. The wire feeder can include a shielding gas regulator to control the flow of shielding gas through the wire feeder. In one embodiment of the invention, there is provided a wire feeder that includes a shielding gas inlet to enable shielding gas from a shielding gas source (e.g., gas cylinder, etc.) to be fed through the wire feeder and into a shielding gas tube or a cable of a welding gun to provide shielding gas to a workpiece during a welding operation. In one aspect of this embodiment, the wire feeder includes a flow controller to control the flow rate of shielding gas through the wire feeder. The flow controller can be manually and/or automatically set. In another and/or alternative embodiment of the invention, the wire feeder includes a welding gun cable connector to connect the arc welding gun to the wire feeder which is used to direct a welding current from the wire feeder to the welding gun. A welding wire connector used to connect the welding gun cable or a wire cable so as to direct the welding wire from the wire feeder to the welding gun, a wire connector or wire opening used to receive a welding wire from a welding wire source (e.g., wire reel, wire package, wire container, etc.) into the wire feeder, and a power cable connector which connects the wire feeder to a power cable which in turn is connected to an arc welder power source. In this particular embodiment, all the welding accessories and auxiliary components of a particular arc welding operation are connected to the wire feeder. Only the electrical power to run the components of the wire feeder and the arc welding current are generated by a power supply of a separate arc welder. In one aspect of this embodiment, the arc welder includes one or more selectors to control the wire feed speed, includes one or more selectors to select the type of electrode being used, includes one or more selectors to select the diameter of the electrode being used, includes one or more selectors to select the flow rate of shielding gas used, includes one or more selectors to select the type of shielding gas used, and combinations thereof. As can be appreciated, one or more of these selectors can be located on the wire feeder.

In another aspect of the present invention, there is provided a wire feeder which includes a power conditioner designed to detect a current and/or voltage level flowing through the power cable from the power supply of the arc welder. A portion of the current generated by the power supply of the arc welder is typically used to power one or more components of the wire feeder (e.g., wire feed motor, valves, sensors, internal electronics of the wire feeder, etc.). When a particular brand of Wire feeder is used in conjunction with the same brand of arc welder, the current and voltage levels generated by the power supply of the arc welder are typically compatible with the electrical components of the wire feeder. However, when the wire feeder is connected to another brand of arc welder, the voltage and/or current levels generated by the power supply of the arc welder may be incompatible with one or more electrical components of the wire feeder. As a result, the wire feeder cannot work, does not work properly, and/or one or more components of the wire feeder and/or arc welder are damaged. The power conditioner of the wire feeder is designed to detect the current level and/or voltage level from the power supply of the arc welder and determine whether the current level and/or voltage level is compatible or incompatible with electrical components of the one or more wire feeders. In one embodiment of the invention, the power conditioner, upon determining or verifying that the current level and voltage level from a power source of a particular arc welder are compatible with the electrical components of the wire feeder, allows the current and voltage to pass unmodified to the electrical components in the wire feeder, and/or generates a control signal which is used by one or more controllers of the wire feeder to allow the voltage and current to pass into components of the wire feeder without modification. In another and/or alternative embodiment of the present invention, the power conditioner, upon determining that the voltage level and/or current level is incompatible with one or more electrical components of the wire feeder, modifies the current and/or voltage level so that the modified voltage and/or current level can be utilized by the components of the wire feeder, and/or generates a control signal which is used by one or more electrical components of the wire feeder to signal such electrical components to modify the current and/or voltage level so that the modified current and/or voltage level can be used by the electrical components of the wire feeder. In still another and/or alternative embodiment of the present invention, the power conditioner includes an AC voltage regulator, a DC voltage regulator, a current inhibitor, a phase regulator, and/or a frequency regulator used to adjust the voltage level, the current level, and/or the frequency of the current being received from the power supply of the arc welder when the voltage level, current level, and/or current frequency are incompatible with one or more components of the wire feeder. In yet another and/or alternative embodiment of the present invention, the power conditioner includes a microprocessor, a circuit board, switches, etc. to facilitate in modifying the voltage level, current level, and/or current frequency from an incompatible power source. By incorporating the use of the power conditioner in the wire feeder, the wire feeder can be connected to different types and brands of power supplies of arc welders and enable the wire feeder to be used with such arc welders without having to modify any of the electrical components of the wire feeder. For example, the wire feeder can be designed to operate on a 24 volt power source. As such, when the wire feeder is connected to an arc welder having a power source that generates a 24 volt power source, the wire feeder is able to operate with the arc welder. In addition, the same wire feeder can also be connected to an arc welder that includes a power source that generates a 48 volt power source. When the wire feeder is connected to such an arc welder, the power conditioner in the wire feeder detects the higher voltage level and modifies or causes the received voltage to be modified by stepping down the voltage to 24 volts so that the electrical components of the wire feeder can operate off of the 48 volt power source. As a result, the versatility of the wire feeder is significantly increased since the wire feeder can be used with many different types and brands of arc welders without the concern of having to first modify one or more electrical components of the wire feeder to establish compatibility between the wire feeder and a different type or brand of arc welder.

In still another and/or alternative aspect of the present invention, the wire feeder includes a signal conditioner designed to send and/or receive a control signal to and/or from the arc welder. Some arc welders are designed to send and/or receive a control signal to the wire feeder and/or a feedback signal from the wire feeder which signal is used to control and/or monitor the wire feed speed during a welding procedure, control the shielding gas flow rate during a welding procedure, provide feedback information to the arc welder during an arc welding procedure, etc. The signal conditioner is designed to detect the control signal received from the arc welder and/or feedback signal sent to the arc welder and to modify the signal, when appropriate, so as to enable the wire feeder to work with a particular arc welder. In one non-limiting example, the arc welder is designed to generate a control signal having a voltage range between 0 and 5 volts. The wire feeder is designed to receive a control signal having a voltage range between 10–20 volts. In this particular arrangement, the signal conditioner modifies the voltage level by proportionally increasing the voltage signal received from the arc welder so that the wire feeder can properly operate using the control signal generated by the arc welder. If the arc welder is designed to receive a signal from the wire feeder, the signal modifier can also be designed to proportionally step down the voltage from a 10–20 volt signal to a 0–5 volt signal so that the arc welder and wire feeder can properly communicate between one another. As can be appreciated, many other examples of the signal modifier modifying a signal sent to and/or received from the arc welder are encompassed in the present invention.

In a still yet another and/or alternative aspect of the present invention, the wire feeder includes a power cable connector designed to connect to a power supply of an arc welder. Certain manufacturers of arc welders include different cable connector configurations which are typically designed to prevent competitors from connecting competitive devices to the arc welder. A cable connector of the present invention is designed to universally connected to multiple types of arc welders, or be easily disconnected from the power cable of the wire feeder such that a compatible cable connector can be connected thereto so that the cable can be easily connected to another type of arc welders.

It is the primary object of the invention to provide a wire feeder which can be used with a plurality of different brands and/or types of arc welders.

Another and/or alternative object of the present invention is the provision of a wire feeder which can detect a voltage and/or current level from a power source of an arc welder and determine whether the voltage level and/or current level is compatible for operation of the electrical components of the wire feeder or whether the voltage and/or current level needs to be modified so as to be used to operate the electrical components of the wire feeder.

Still another and/or alternative object of the present invention is the provision of a wire feeder which includes a power conditioner to modify the current level and/or voltage level of a power source from an arc welder that is used to supply power to the wire feeder.

Still yet another and/or alternative object of the present invention is the provision of a wire feeder which includes an AC voltage regulator, a DC voltage regulator, a current limiter, a phase regulator, and/or a frequency regulator.

A further and/or alternative object of the present invention is the provision of a wire feeder that includes a signal conditioner to modify a control signal being received from an arc welder and/or a feedback signal being sent to an arc welder from the wire feeder.

Still a further and/or alternative object of the present invention is the provision of a wire feeder which includes a power cable connector which can be reliably connected to a variety of different arc welders and/or can be detachable connected to a power cable of a wire feeder and switched with another type of connector so that the power cable can be connected to a different type of arc welder.

These and other objects and advantages will become apparent from the following description taken together with the accompanying drawings.

BRIEF DESCRIPTION OF DRAWINGS

Reference may now be made to the drawings, which illustrate an embodiment that the invention may take in physical form and in certain parts and arrangements of parts wherein;

FIG. 1A illustrates a basic arrangement of a Type A wire feeder being connected to a Type A power source;

FIG. 1B is a prior art illustration of a Type B wire feeder being connected to a Type B power source;

FIG. 2 illustrates a Type A wire feeder being connected to a Type A power source without any modification to the power cable and a Type A wire feeder being connected to a Type B power source by including a transformer that has been integrated into the power cable; and, FIG. 3 is a Type U wire feeder in accordance with the present invention wherein the wire feeder can be connected to a Type A power source, a Type B power source, or a Type C power source without having to integrate a transformer in the power cable of the wire feeder.

DESCRIPTION OF THE PREFERRED EMBODIMENT

Referring now to the drawings wherein the showings are for the purpose of illustrating the preferred embodiment only, and not for the purpose of limiting the same, FIG. 1 illustrates a basic arrangement of a Type A wire feeder 10 which is connected to a Type A power source 40. Likewise, FIG. 1B illustrates a Type B wire feeder 10' which is connected to a Type B power supply 40'. FIGS. 1A and 1B illustrate a particular type of wire feeder being connected to a similar type of power source. For instance, the Type A wire feeder may be a Lincoln Electric type wire feeder, which is connected to a Lincoln Electric arc welder. Likewise, the Type B wire feeder may be a Miller Electric wire feeder, which is connected to a power source of a Miller Electric arc welder. Both the Type A and Type B wire feeders are illustrated as having similar components. For instance, each of the wire feeders includes a wire feed motor 12, 12' which controls the speed of a wire electrode 30, 30' being fed from a wire reel 16, 16'. A circuitboard or control board 14, 14' that is used to control the speed of the motor 12, 12' and to control the other components of the wire feeder. The wire feeders also include a cable connector designed to connect to a gun cable 22, 22' of a welding gun 20, 20'. The gun cable directs a welding current from the wire feeder to gun head 24, 24' of the welding gun. Wire electrode 30, 30' is also directed to the welding gun, as is a shielding gas, when used. During a welding operation, an arc is formed between the wire electrode and workpiece W which causes the wire electrode to melt and form a weld puddle on workpiece W. Wire feeders 10, 10' also include a power cable 18, 18' which connects the wire feeder to power supply 40, 40', respectively. Power supplies 40, 40' are typically housed in an arc welder. The arc welder typically includes one or more input selectors to generate a particular arc welding current and/or voltage for use in a particular welding operation. The power supply of the arc welder typically generates a current used for a particular type of arc welding procedure (e.g., MIG, TIG, etc.). The power supply of the arc welder also supplies a particular current level and voltage to the wire feeder via the power cable so as to supply power to the electrical components of the wire feeder. As shown in FIGS. 1A and 1B, the same type of power supply is connected to the same type of wire feeder, thus the particular current level and voltage level being generated by a particular power supply is compatible with the electrical components of the particular wire feeder. For instance, the Type A power supply may generate a voltage level of 24 volts to a Type A wire feeder. Motor 12 and circuit board 14 of wire feeder 10 are designed to run off the current and voltage level generated by the Type A power source. The Type B power supply can be designed such that the voltage level generated by the power supply is 48 volts. The motor and control board of the Type B wire feeder are designed to operate on such a voltage level. Because the motor 12' and control board 14' of the Type B wire feeder 10' are designed to operate off of a higher voltage level, the Type B wire feeder cannot be connected to the Type A power source since the Type A power source is a 24 volt power source, thus incompatible with the components of the Type B wire feeder.

Referring now to FIG. 2, the power cable 18 of the Type A wire feeder 10 is illustrated as being modified prior to being connected to a Type B power supply 40'. In this particular arrangement, transformer 50 is electrically connected to the power cable. Transformer 50 is designed to step down or step up the voltage level generated by the Type B power supply 40' so that the motor 12 and control board 14 of the Type A wire feeder can operate off of the power generated by the Type B power supply. As described above, the Type B power supply generates a voltage level of 48 volts and the Type A power supply generates a voltage level of 24 volts. As can be appreciated, other voltage levels can be generated by the Type A or Type B power supplies. The Type A wire feeder 10 is designed to operate off of a 24 volt power supply generated by the Type A power supply. As a result, power cable 18 does not need to be modified as shown in FIG. 2, prior to being connected to the Type A power supply. When the Type A wire feeder is to be connected to the Type B power supply, a transformer 50 is connected to power cable 18 or a different power cable which already includes transformer 50 connected between the Type A wire feeder and the Type B power supply so that the voltage generated by the Type B power supply is stepped down so as to operate the components of the Type A wire feeder. When the transformer is inserted in the power cable, the power cable is typically cut and the transformer is then wired to the power cable. Care must be taken so as to properly wire the transformer to the power cable so as to not damage the power cable, wire feeder and/or power supply during operation. Care must also be taken to select the proper transformer so that the power supply and wire feeder can be connected together and operate together without damaging the power cable, wire feeder and/or power supply.

Referring now to FIG. 3, there is provided a wire feeder 90 in accordance with the present invention. Wire feeder 90 is designated as an U-Type wire feeder. This wire feeder is a universal type wire feeder which can be used with many different types of power supplies. As shown in FIG. 3, wire feeder 90 can be connected to a Type A power supply 40, a Type B power supply 40', a type C power supply 40", etc. These power sources may be designed to generate a current and/or voltage level which is the same or different. For instance, the Type A power supply may be manufactured by The Lincoln Electric Company, the Type B power supply may be manufactured by Miller Electric Company, and the type C power supply may be manufactured by ESAB. As can be appreciated, the power supplies can be manufactured by other manufacturers. For purposes of describing this particular embodiment and not for purposes of limiting the same, the Type A power supply will be described as generating voltage and current to operate a wire feeder wherein the voltage level is 24 volts, the Type B power supply voltage level is 48 volts, and the type C power supply will be described as generating a voltage and current to operate a wire feeder wherein the voltage level is about 240 volts. Wire feeder 90 of the present invention is designed to be connected to all three of these different power supplies without having to modify the electrical circuitry of the wire feeder or power cable 100. As described above with respect to FIG. 2, when the wire feeder is connected to a power supply generating a current and/or voltage that is different from the current or voltage rated to operate the wire feeder, the power cable has to be modified to include a transformer 50 so that the power generated by a particular power source is compatible with the electrical components of the wire feeder. Wire feeder 90 of the present invention is designed to not require modification prior to the wire feeder being connected with a particular power source. As can be appreciated, power cable 100 may include a universal connector or an interchangeable connector to enable the power cable to be mechanically connected to a particular power source; however, the interchanging of a connector so as to allow a power cable to be mechanically connected to a particular power source does not constitute the altering of the electrical characteristics of the power cable or wire feeder 90 for purposes of the present invention.

As shown in FIG. 3, wire feeder 90 includes a wire reel 92 that supplies a consumable wire electrode 120 through motor 70 and into welding gun 110. Welding gun 110 is illustrated as being connected to the wire feeder by gun cable 112. At the end of welding gun 110 is a gun head 114 wherein wire electrode 120 passes therethrough and is deposited on a workpiece W to form a weld bead. Wire feeder 90 also includes a modified control board 80 which is designed to detect the current level and/or voltage level of the power being supplied to the wire feeder by power cable 110 and to determine if the particular current level and/or voltage level is compatible with the other electrical components of the wire feeder. When control board 80 determines that a particular current level and voltage level of the power being generated by a particular power supply is compatible with the internal electrical components of the wire feeder, the control board allows the supplied current and voltage to be supplied to the internal electrical components of the wire feeder during the operation of the wire feeder. However, when control board 80 detects that the voltage level and/or current level being supplied to the wire feeder by a particular power supply is incompatible, the control board modifies or conditions the power source so as to convert the received power from the power supply to a compatible power source that can be used by the internal components of the wire feeder. Control board 80 may itself include electrical components necessary to modify or condition the power received from a power supply and/or generate a control signal which is used by auxiliary components in the wire feeder that modify or condition the power received from a particular power source. Typically, the control board includes a microprocessor and/or hard wired circuit to detect the current level and/or voltage level from a power source and to modify or generate a control signal that results in a particular current level and/or voltage level to be modified into a compatible power source.

Control board 80 may also include circuitry to detect a control signal received from a particular type of arc welder and/or to send a control signal to a particular arc welder and in appropriate circumstances, to modify the control signal such that the control signal received by the wire feeder and/or sent from the wire feeder to an arc welder is a compatible control signal.

Wire feeder 90 illustrated in FIG. 3 enables an operator to use the wire feeder with a number of different arc welders without having to electrically modify any of the components of the wire feeder. Consequently, an operator that is comfortable or familiar with a particular wire feeder and the components attached thereto can simply connect the wire feeder to an arc welding source and begin a welding operation without having to determine whether the power supply of the particular arc welder generates a compatible power source for the wire feeder. In addition, an operator in the field can simply disconnect wire feeder 90 from a particular arc welder and reconnect the wire feeder to another arc welder without concern about the compatibility of the wire feeder with the arc welder. This is an advantage especially when a particular arc welder becomes disabled or otherwise malfunctions. In such a situation, the operator merely disconnects the wire feeder from the malfunctioned or disabled arc welder and reconnects the wire feeder to another arc welder, thereby minimizing downtime relating to a particular welding operation.

Numerous modifications may be made to the present invention which may fall within the intended scope hereof. Thus, it should be apparent that there has been provided in accordance with the present invention a method and apparatus for welding that fully satisfies the objectives and advantages set forth above. Although the invention has been described in conjunction with a specific embodiment, it is evident that many alternatives, modifications and variations will be apparent to those skilled in the art. Accordingly, it is intended to embrace all such alternatives, modifications and variations that, fall within the spirit and broad scope of the invention and claims. It is also to be understood that the invention is not limited in its application to the details of construction and the arrangement of the components set forth in the description above or illustrated in the drawings. The invention is capable of other embodiments or of being practiced or carried out in various ways. Also, it is to be understood that the phraseology and terminology employed herein is for the purpose of description and should not be regarded as limiting.

I claim:

1. A universal wire feeder designed to be connectable to a plurality of different types of power supplies of a plurality of different types of arc welders comprising:
   a power cable designed to be electrically connectable to said power supply of said arc welder;
   a welding wire motor designed to feed a consumable welding wire; and,
   a power conditioner at least partially integrated in said wire feeder and designed to detect a current level, a voltage level and current frequency from said power source of said arc welder used to power said welding wire motor, said power conditioner designed to enable the current level, the voltage level and current frequency to pass through said power conditioner unmodified when said detected current level and voltage level are compatible to properly power said welding wire motor, said power condition designed to cause the required modification of the current level, the voltage level, and current frequency to properly power said welding wire motor when said detected current level, said voltage level, said current frequency, or combinations thereof is incompatible to power said welding wire motor.

2. The universal wire feeder as defined in claim 1, wherein said power conditioner includes an AC voltage regulator, a DC voltage regulator, a current limiter, a phase regulator, a frequency regulator, or combinations thereof.

3. The universal wire feeder as defined in claim 2, wherein said power conditioner includes a microprocessor, circuit board, or combinations thereof to detect and at least partially modify said current level, said voltage level, said current frequency or combinations thereof.

4. The universal wire feeder as defined in claim 3, wherein said power conditioner and said welding wire motor are housed in a unit separate from a unit housing for said power supply of said arc welder.

5. The universal wire feeder as defined in claim 4, including a signal conditioner to receive, send of combinations thereof a control signal between said arc welder and said wire feeder, said signal conditioner designed to detect incompatible control signals to said wire feeder, from said wire feeder of combinations thereof, said signal condition designed to modify incompatible control signals to said wire feeder, from said wire feeder or combinations thereof to enable a proper control arrangement between said wire feeder and said arc welder.

6. The universal wire feeder as defined in claim 5, wherein said power cable includes a universal connector or interchangeable connector designed to be reliably connectable to said power supply of a plurality of different types of said arc welders.

7. The universal wire feeder as defined in claim 6, wherein said connector is detachably connected to said power cable.

8. The universal wire feeder as defined in claim 7, including a wire speed selector to select a speed of said welding wire motor.

9. The universal wire feeder as defined in claim 2, wherein said power conditioner and said welding wire motor are housed in a unit separate from a unit housing for said power supply of said arc welder.

10. The universal wire feeder as defined in claim 2, including a signal conditioner to receive, send, or combinations thereof a control signal between said arc welder and said wire feeder, said signal conditioner designed to detect incompatible signal to said wire feeder, from said wire feeder of combinations thereof, said signal condition designed to modify incompatible control signals to said wire feeder, from said wire feeder or combinations thereof to enable a proper control arrangement between said wire feeder and said arc welder.

11. The universal wire feeder as defined in claim 2, wherein said power cable includes a universal connector or interchangeable connector designed to be reliably connectable to said power supply of a plurality of different types of said arc welders.

12. The universal wire feeder as defined in claim 1, wherein said power conditioner includes a microprocessor, circuit board, or combinations thereof to detect and at least partially modify said current level, said voltage level, said current frequency, or combinations thereof.

13. The universal wire feeder as defined in claim 12, wherein said power conditioner and said welding wire motor are housed in a unit separate from a unit housing for said power supply of said arc welder.

14. The universal wire feeder as defined in claim 12, including a signal conditioner to receive, send, or combinations thereof a control signal between said arc welder and said wire feeder, said signal conditioner designed to detect incompatible control signals to said wire feeder, from said wire feeder or combinations thereof, said signal condition designed to modify incompatible control signals to said wire feeder, from said wire feeder or combinations thereof to enable a proper control arrangement between said wire feeder and said arc welder.

15. The universal wire feeder as defined in claim 12, wherein said power cable includes a universal connector or interchangeable connector designed to be reliably connectable to said power supply of a plurality of different types of said arc welders.

16. The universal wire feeder as defined in claim 1, wherein said power conditioner and said welding wire motor are housed in a unit separate from a unit housing for said power supply of said arc welder.

17. The universal wire feeder as defined in claim 16, including a signal conditioner to receive, send, or combinations thereof a control signal between said arc welder and said wire feeder, said signal conditioner designed to detect incompatible control signal to said wire feeder, from said wire feeder of combinations thereof, said signal condition designed to modify incompatible control signals to said wire feeder, from said wire feeder of combinations thereof to enable a proper control arrangement between said feeder and said arc welder.

18. The universal wire feeder as defined in claim 16, wherein power cable includes a universal connector or interchangeable connector designed to be releasbly connectable to said power supply of a plurality of different types of said arc welders.

19. The universal wire feeder as defined in claim 1, including a signal conditioner to receive, send, or combinations thereof a control signal between said arc welder and said wire feeder, said signal conditioner designed to detect incompatible control signals to said wire feeder, from said wire feeder of combinations thereof, said signal condition designed to modify incompatible control signals to said wire feeder, from said wire feeder of combinations thereof, to enable a proper control arrangement between said wire feeder and said arc welder.

20. The universal wire feeder as defined in claim 19, wherein power cable includes a universal connector or interchangeable connector designed to be reliably connectable to said power supply of a plurality of different types of said arc welders.

21. The universal wire feeder as defined in claim 1, wherein power cable includes a universal connector or interchangeable connector designed to be reliably connectable to said power supply of a plurality of different types of said arc welders.

22. The universal wire feeder as defined in claim 21, wherein said connector is detachably connected to said power cable.

23. A method of connecting a universal wire feeder to an arc welder comprising:
   providing a power cable designed to be electrically connectable to a power supply of said arc welder;
   providing a detection arrangement at least partially in said wire feeder to detect a current level, a voltage level, and current frequency from said power supply;
   enabling said detected current level, the voltage level and current level, voltage level and current frequency are compatible to properly power said welding wire motor; and,
   providing a modifying arrangement at least partially in said wire feeder to modify said detected current level, the voltage level, or combinations thereof when said detected current level, the voltage level, said current frequency or combinations thereof is incompatible to power said welding wire motor of said universal wire feeder.

24. The method as defined in claim 23, including a power conditioner that modifies said current level, the voltage level, or combinations thereof, said power conditioner including an AC voltage regulator, a DC voltage regulator, a current limiter, a phase regulator, a frequency regulator, or combinations thereof.

25. The method as defined in claim 24, including the step of detecting a control signal, traveling between said arc welder and said wire feeder, and also including the step of determining whether said detected control signal is incompatible to said wire feeder, and further including the step of modifying a detected incompatible control signal to enable a proper control arrangement between said wire feeder and said arc welder, said control signal being an analog signal, a digital signal, an electromagnetic signal, a fiber-optic signal, or combinations thereof, said control signal providing a signal for wire feed speed, arc welder identification, welding parameter information, or combinations thereof.

26. The method as defined in claim 25, wherein power cable includes a universal connector or interchangeable connector designed to be reliably connectable to said power supply of a plurality of different types of said arc welders.

27. The method as defined in claim 26, wherein said connector is detachably connected to said power cable.

28. The method as defined in claim 24, wherein power cable includes a universal connector or interchangeable connector designed to be reliably connectable to said power supply of a plurality of different types of said arc welders.

29. The method as defined in claim 28, wherein said connector is detachably connected to said power cable.

30. The method as defined in claim 23, including the step of detecting a control signal, traveling between said arc welder and said feeder, and also including the step of determining whether said detected control signal is incompatible to said wire feeder, and further including the step of modifying a detected incompatible control signal to enable a proper control arrangement between said wire feeder and said arc welder, said control signal being an analog signal, a digital signal, an electromagnetic signal, a fiber optic signal, or combinations thereof, said control signal providing a sign speed, arc welder identification, welding parameter information, or combinations thereof.

31. The method as defined in claim 30, wherein power cable includes a universal connector or interchangeable connector designed to be reliably connectable to said power supply of a plurality of different types of said arc welders.

32. The method as defined in claim 31, wherein said connector is detachably connected to said power cable.

33. The method as defined in claim 23, wherein power cable includes a universal connector or interchangeable connector designed to be reliably connectable to said power supply of a plurality of different types of said arc welders.

34. The method as defined in claim 33, wherein said connector is detachably connected to said power cable.

* * * * *